(12) United States Patent
Kamikubo et al.

(10) Patent No.: US 7,083,674 B1
(45) Date of Patent: Aug. 1, 2006

(54) PIGMENT DISPERSANT, AND PIGMENT COMPOSITION, PIGMENT DISPERSION AND PRINTING INK USING THE SAME

(75) Inventors: Takashi Kamikubo, Tokyo (JP); Tetsuya Sai, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 11/218,611

(22) Filed: Sep. 6, 2005

(51) Int. Cl.
- C09B 67/20 (2006.01)
- C09B 67/22 (2006.01)
- C08K 5/23 (2006.01)
- C09D 11/00 (2006.01)

(52) U.S. Cl. ............... 106/496; 106/31.75; 106/31.8; 106/31.81; 106/493; 106/494; 106/498; 534/692; 534/720; 534/724; 534/730

(58) Field of Classification Search ............ 106/31.75, 106/31.8, 31.81, 493, 494, 496, 498; 534/692, 534/720, 724, 730
See application file for complete search history.

(56) References Cited

U.S. PATENT DOCUMENTS

| | | | |
|---|---|---|---|
| 2,855,403 A | 10/1958 | McKellin et al. | |
| 3,684,771 A | 8/1972 | Braun | |
| 3,741,941 A | 6/1973 | Ashe | |
| 3,748,308 A | 7/1973 | Ashe | |
| 3,788,996 A | 1/1974 | Thompson | |
| 5,635,552 A | 6/1997 | Endo et al. | |
| 5,854,323 A * | 12/1998 | Itabashi et al. | 524/88 |
| 6,005,085 A * | 12/1999 | Ueno et al. | 534/651 |
| 6,123,763 A * | 9/2000 | Kamikubo et al. | 106/506 |

FOREIGN PATENT DOCUMENTS

| | | |
|---|---|---|
| EP | 1 122 286 A1 | 8/2001 |
| EP | 1 146 094 A2 | 10/2001 |
| JP | 46-7294 | 12/1971 |
| JP | 60-166318 | 8/1985 |
| JP | 61-174939 | 8/1986 |
| JP | 8-127749 | 5/1996 |
| JP | 9-169821 | 6/1997 |
| JP | 11-199796 | 7/1999 |

OTHER PUBLICATIONS

U.S. Appl. No. 11/218,611, filed Sep. 6, 2005, Kamikubo et al.
U.S. Appl. No. 05/092,949, filed Nov. 25, 1970.
U.S. Appl. No. 5/120,768, filed Mar. 3, 1971.
U.S. Appl. No. 5/120,770, filed Mar. 3, 1971.
U.S. Appl. No. 5/120,773, filed Mar. 3, 1971.
U.S. Appl. No. 5/120,774, filed Mar. 3, 1971.

* cited by examiner

Primary Examiner—Anthony J. Green
(74) Attorney, Agent, or Firm—Oblon, Spivak, McClelland, Maier & Neustadt, P.C.

(57) ABSTRACT

A pigment dispersant represented by the following general formula (1) is provided:

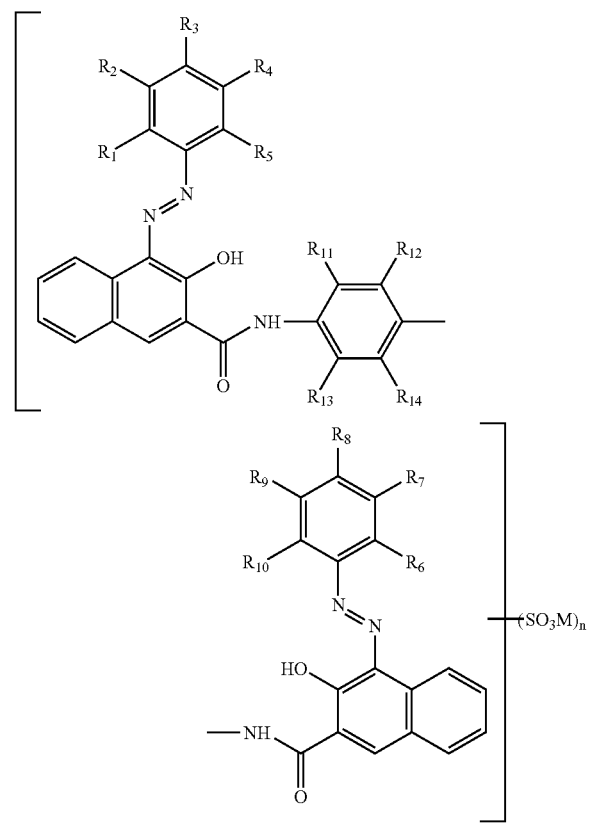

wherein $R_1$, $R_2$, $R_3$, $R_4$, $R_5$, $R_6$, $R_7$, $R_8$, $R_9$ and $R_{10}$ each independently is —H, —Cl, —$CH_3$, —$CF_3$, —$NO_2$, —COOCH($CH_3$)$_2$ or —COOCH$_2$CH$_2$Cl; $R_{11}$, $R_{12}$, $R_{13}$ and $R_{14}$ each independently is —H, —Cl, —$CH_3$ or —CN; M is one equivalent of a bivalent or trivalent metal; and n is an integer of 1 to 3.

6 Claims, No Drawings

PIGMENT DISPERSANT, AND PIGMENT COMPOSITION, PIGMENT DISPERSION AND PRINTING INK USING THE SAME

BACKGROUND OF THE INVENTION

1. Field of the Invention

The present invention relates to a pigment dispersant. More specifically, it relates to a pigment composition, a pigment dispersion and a printing ink which contain the pigment dispersant.

2. Description of the Related Art

In a printing ink, a paint coating or the like, a pigment is dispersed in a fine state, whereby printed matters or coated articles have properties such as a clear color tone and gloss. Moreover, when the pigment is dispersed in a stable state, flowability of the printing ink or the paint coating is improved, which leads to the improvement of printability. In addition, labor and energy can be remarkably reduced during the manufacture of the printing ink or the paint coating. Furthermore, when a dispersion is in a stable state, it is generally excellent in storage stability.

The pigment used in the printing ink or the paint coating often has a fine particle diameter in order to realize a clearer color tone. However, when the particles of the pigment are fine, aggregation between the pigment particles becomes strong, and hence it is often difficult to obtain such properties as mentioned above.

In order to solve such a problem, it has been known that a pigment dispersant is used to enhance affinity between the pigment and a vehicle, thereby stabilizing the dispersion. Hitherto, various kinds of pigment dispersants have been disclosed.

For example, as disclosed in Japanese Patent Publication No. 2466/1966 and U.S. Pat. No. 2,855,403, it has been known to use compounds obtained by introducing a side chain substituent selected from a sulfonic acid group, a sulfonamide group, an aminomethyl group, a phthalimidomethyl group and the like into an organic pigments as a main structure. These compounds have large effects of a non-aggregating property, crystal stability and the like, but they have characteristics close to dyes. Accordingly, they are inferior to pigments in durability in some cases. Therefore, when a pigment composition for inks and paint coatings contains these compounds, hues of the compounds fade with time, thereby, hues of coating films change in some cases. Moreover, after coated films are formed, these compounds come to migrate to the surfaces of the coated films by a high-temperature treatment such as boiling or baking or by pressure attachment, thereby, a migration of color occur in some cases.

Furthermore, in Japanese Patent Application Laid-Open Nos. 127749/1996 and 199796/1999, there is disclosed, for solving these problems, basic compounds each containing a triazine ring which does not have a coloration inherent in the pigments and which has versatility for the various pigments. These compounds show an effect when used in combination with a binder having an acidic functional group such as an acrylic resin or an alkyd resin, but they have not exhibited the sufficient effect in the case that a naphthol pigment and a condensed azo pigment are contained in the pigment. Moreover, in the case that the compounds are used in combination with a binder having a basic functional group such as a polyurethane resin or a polyamide resin, they have hardly exhibited the effect. In particular, in the case that there is used a highly basic polyurethane resin containing a urea bond which is used for gravure inks and the like, any effect has not been exhibited.

Namely, it is desired to develop a pigment dispersant which is excellent in flowability and dispersion stability in the case that it is used in a printing ink or a paint coating and which is excellent in gloss in the case of the formation of dry films. In particular, a pigment dispersant is desired which is effective for naphthol pigments and condensed azo pigments.

SUMMARY OF THE INVENTION

A first aspect of the present invention is directed to a pigment dispersant represented by the following general formula (1):

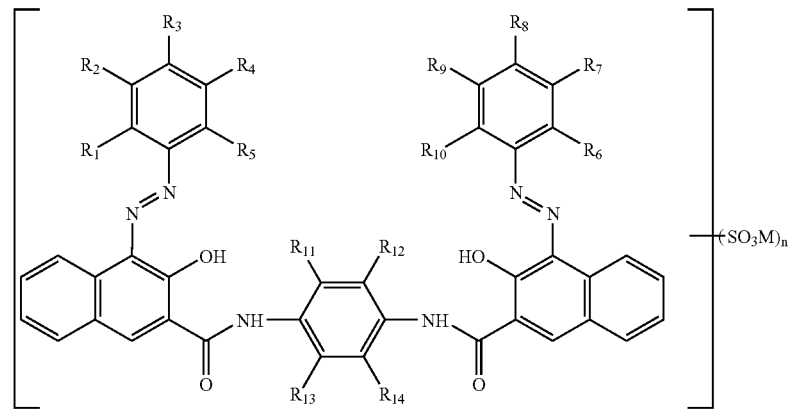

wherein $R_1$, $R_2$, $R_3$, $R_4$, $R_5$, $R_6$, $R_7$, $R_8$, $R_9$ and $R_{10}$ each independently is —H, —Cl, —CH$_3$, —CF$_3$, —NO$_2$, —COOCH(CH$_3$)$_2$ or —COOCH$_2$CH$_2$Cl; $R_{11}$, $R_{12}$, $R_{13}$ and $R_{14}$ each independently is —H, —Cl, —CH$_3$ or —CN; M is one equivalent of a bivalent or trivalent metal; and n is an integer of 1 to 3.

A second aspect of the present invention is directed to a pigment composition comprising at least one pigment selected from naphthol pigments and condensed azo pigments, and a pigment dispersant represented by the above general formula (1). If necessary, the pigment composition may further comprise a polymeric pigment dispersant, and its weight average molecular weight is preferably from 1,000 to 100,000.

A third aspect of the prevent invention is directed to a pigment dispersion in which the above pigment composition is dispersed into a vehicle. Examples of the vehicle include nonaqueous and aqueous vehicles. The nonaqueous vehicle may comprise a resin having a weight average molecular weight of 5,000 to 100,000, and this resin may be a urethane resin having at least one urea bond in one molecule.

A fourth aspect of the present invention in directed to a printing ink comprising the pigment dispersion.

According to the embodiments of the present invention, it becomes possible to obtain an ink and a paint coating excellent in not only non-aggregating property, noncrystallinity and flowability but also gloss and hue of coating films.

The present disclosure relates to subject matter contained in Japanese Patent Application No. 2004-064265, filed on Mar. 8, 2004, the disclosure of which is expressly incorporated herein by reference in its entirety.

DETAILED DESCRIPTION OF THE PRESENT INVENTION

The present invention will be described in detail.

An embodiment of the present invention is concerned with a pigment dispersant represented by the following general formula (1):

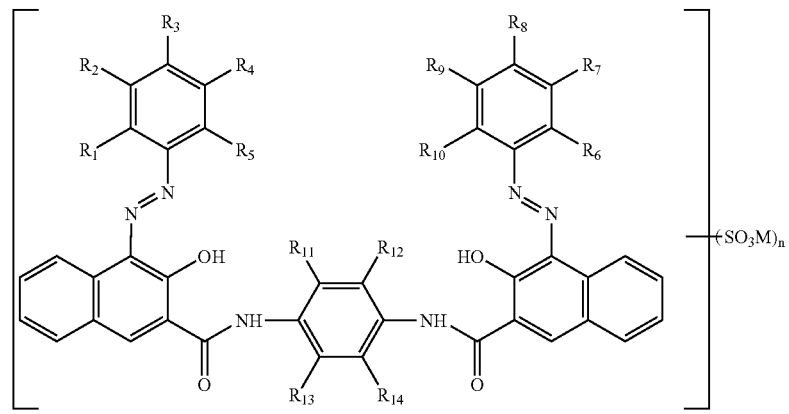

wherein $R_1$, $R_2$, $R_3$, $R_4$, $R_5$, $R_6$, $R_7$, $R_8$, $R_9$ and $R_{10}$ each independently is —H, —Cl, —CH$_3$, —CF$_3$, —NO$_2$, —COOCH(CH$_3$)$_2$ or —COOCH$_2$CH$_2$Cl; $R_{11}$, $R_{12}$, $R_{13}$ and $R_{14}$ each independently is —H, —Cl, —CH$_3$ or —CN; M is one equivalent of a bivalent or trivalent metal; and n is an integer of 1 to 3.

At most two groups selected from $R_1$ to $R_5$ are —Cl or CF$_3$, and the rest of $R_1$ to $R_5$ are —H, preferably. At most two groups selected from $R_6$ to $R_{10}$ are —Cl or CF$_3$, and the rest of $R_6$ to $R_{10}$ are —H, preferably. All of $R_{11}$ to $R_{14}$ are —H, or at most two groups selected from $R_{11}$ to $R_{14}$ are —Cl, preferably. Preferred examples of general formula (1) are the following:

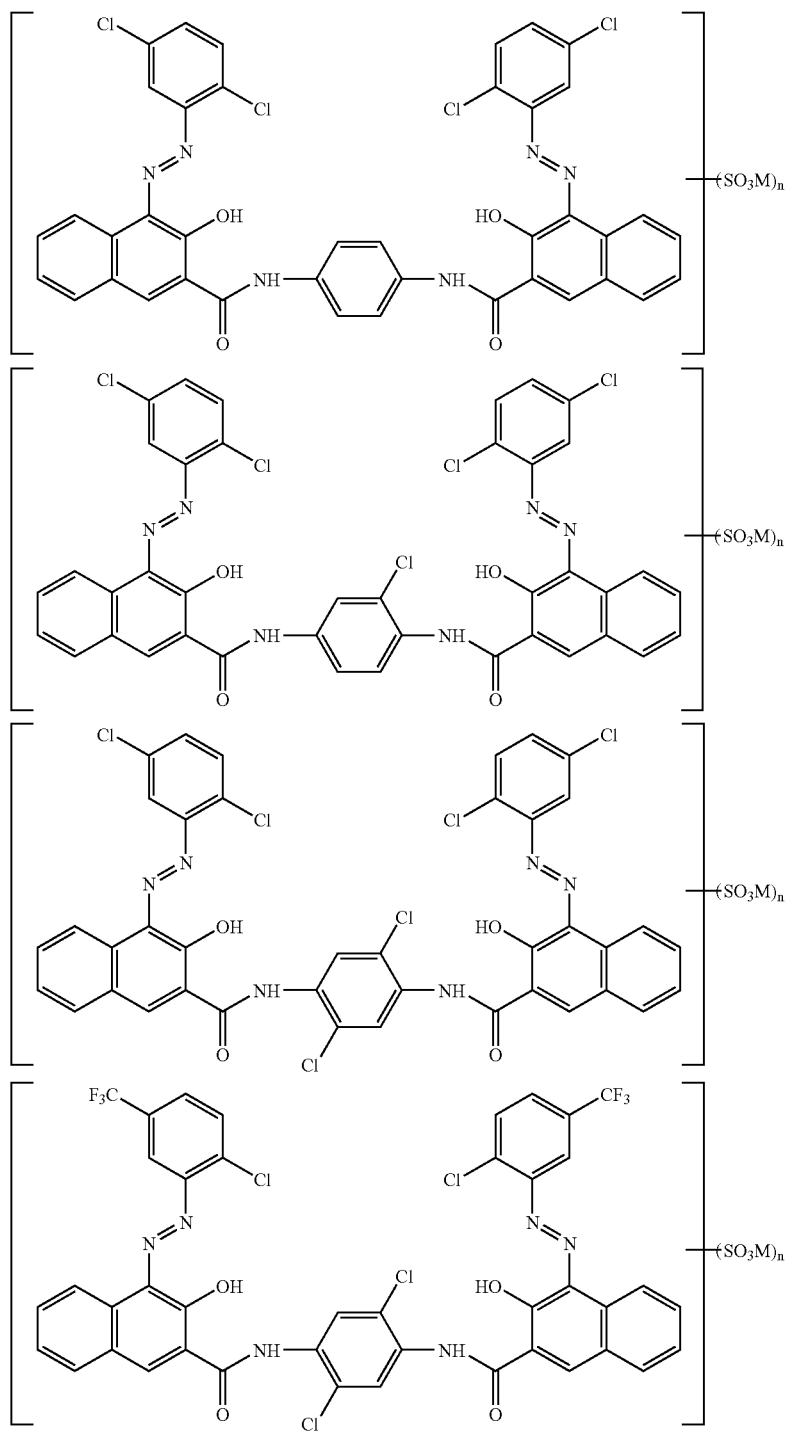

The pigment dispersant of the general formula (1) is formed by introducing sulfonic acid into a condensed azo pigment and converting the sulfonic acid into a metal salt.

Examples of the condensed azo pigment for use in the synthesis of the pigment dispersant of the general formula (1) include, but are not limited to, Pigment Red 144, 166, 214, 220, 221, 242, 248 and 262, and Pigment Brown 23 and 42 in terms of generic names of Color Index.

Examples of the metal "M" contained in the general formula (1) include, but are not limited to, calcium, barium, magnesium, iron, aluminum, nickel, cobalt, and strontium. Among them, preferred metal "M" is aluminum.

The number "n" of the sulfonic acid substituents is from 1 to 3 and pigment dispersants having different "n" may be co-present. When the number of the sulfonic acid substituents is 4 or more, a sufficient effect may not be obtained, and furtherer a migration property tends to deteriorate. The number of the sulfonic acid substituents is sometimes represented by an average number of substituents and the average number of substituents is preferably from 1 to 2.

One example of a process for producing the pigment dispersant of the general formula (1) is as follows.

First, a condensed azo pigment is dissolved in concentrated sulfuric acid. The sulfuric acid solution is kept at ambient temperature or heated so as to effect sulfonation. Then, the sulfuric acid solution is poured into a sufficient amount of ice water to form a suspension. The suspension is filtrated and washed with water to obtain a sulfonated press cake. The press cake is transformed into slurry with water or an organic solvent, and then a powder or an aqueous solution of a strong acid salt of a metal is added in an amount slightly larger than an equimolar amount. Examples of the strong acid salt Include, but are not limited to, hydrochloride salts, sulfate salts, and nitrate salts. Then, the mixture is stirred and filtered, and the remainder is washed with water and dried to obtain a pigment dispersant which is a metal salt compound represented by the general formula (1).

The pigment dispersant of the general formula (1) exhibits an effect on various pigments to be used for printing inks or paint coatings, particularly, exhibits an excellent effect on naphthol pigments and condensed azo pigments. Examples of the naphthol pigment include, but are not limited to, Pigment Red 2, 3, 5, 7, 9, 12, 14, 22, 23, 31, 112, 146, 170, 171, 175, 176 and 185, Pigment Orange 5, 24 and 38, Pigment Brown 25, and Pigment Violet 32 in terms of generic names of Color Index. Moreover, examples of the condensed azo pigment include, but are not limited to, Pigment Red 144, 166, 214, 220, 221, 242, 248 and 262, Pigment Orange 31, and Pigment Brown 23, 41 and 42 in terms of generic names of Color Index.

The pigment composition of the present invention is obtained by adding the pigment dispersant represented by the formula (1) solely or by adding it in combination with a polymeric pigment dispersant.

The polymeric pigment dispersant to be used for the pigment composition of the present invention preferably comprises a linear or comb-like polymeric copolymer selected from a polyester-based, acrylic and urethane-based copolymer. Moreover, the polymeric pigment dispersant preferably has a basic group, acidic group, aromatic group or the like at the terminal of a linear polymer at the basal part of a comb-like polymer, or at random or as a block in a linear polymer and/or a comb-like polymer. Such pigment dispersants are disclosed in Japanese Patent Laid-Open Nos. 166318/1985, 174939/1986, 7294/1971, and 169821/1997, the disclosure of which are incorporated herein by reference in its entirety.

The weight average molecular weight of the polymeric pigment dispersant is preferably from 1,000 to 100,000, more preferably from 5,000 to 50,000. When the molecular weight is smaller than 1,000, a sufficient steric hindrance may not be obtained and the dispersing effect sometimes decreases. Moreover, when the weight average molecular weight is larger than 100,000, there is a case that an aggregating action arises.

The amine value of the polymeric pigment dispersant is preferably from 5 to 200 mgKOH/g. When the value is less than 5 mgKOH/g, the interaction with the pigment dispersant of the present invention is not sufficient, and thus a sufficient dispersing effect is sometimes not obtained even when the pigment dispersant of the present invention is adsorbed on the pigment surface. On the other hand, when the amine value of the polymeric pigment dispersant exceeds 200 mgKOH/g, a steric hindrance layer decreases as compared with an affinity part to the pigment component and thus a sufficient dispersing effect is sometimes not obtained.

Such a polymeric pigment dispersant may be a commercially available product, and examples of the dispersant include, but are not limited to, Solsperse 24000 (manufactured by Avecia), Disperbyk-160, Disperbyk-161, Disperbyk-162, Disperbyk-163, Disperbyk-170 (manufactured by Byk Chemie), Ajisper PB711, and Ajisper PB821 (manufactured by Ajinomoto Fine-Techno Co. Inc.).

The amount of the pigment dispersion represented by the general formula (1) to be added is preferably from 0.5 to 30 parts by weight, more preferably from 1 to 10 parts by weight based on 100 parts by weight of the pigment. The amount of the polymeric pigment dispersant to be added is preferably from 0.5 to 100 parts by weight, more preferably from 5 to 30 parts by weight based on 100 parts by weight of the pigment.

When each of the amounts of the pigment dispersion represented by the general formula (1) and the polymeric pigment dispersant to be added is smaller than 0.5 part by weight, a pigment-dispersing effect is small. Moreover, even when the pigment dispersion represented by the general formula (1) is used in an amount larger than 30 parts by weight, an effect proportional to the amount used is not obtained. When the polymeric pigment dispersant is used in an amount larger than 100 parts by weight, an effect may not be obtained, and further coating film properties may deteriorate in some cases.

A pigment dispersant of the invention is dispersed into a vehicle to obtain a pigment dispersion. Examples of methods for dispersing the pigment dispersant according to the invention include the following techniques:

1. A pigment composition obtained by mixing a pigment and a pigment dispersant beforehand is added into a vehicle and dispersed therein.

2. A pigment and a pigment dispersant are separately added to a vehicle and dispersed therein.

3. A pigment and a pigment dispersant are separately dispersed in each vehicle and the resulting dispersions are mixed with each other. In this case, the pigment dispersant may be dispersed in a solvent in place of a vehicle.

4. After a pigment is dispersed in a vehicle, a pigment dispersant is added to the resulting pigment dispersion.

An objective effect is obtained by any of these methods.

As the method of preparing the pigment composition, a sufficient dispersing effect is obtained by simply mixing a pigment powder and the pigment dispersant of the present invention. In order to obtain further satisfactory results, there may be carried out a mixing method for sufficient mixture, for example: mechanical mixing by means of a kneader, a roll, an attriter, a super mill, one of various pulverizer, or the like; addition of a solution containing the pigment dispersant of the present invention to a suspension system of a pigment in water or an organic solvent to deposit the pigment dispersant on the pigment surface; co-dissolution of an organic pigment and a pigment dispersant in a solvent having a strong dissolving ability, such as sulfuric acid, to co-precipitate them with a poor solvent such as water; or the like.

Moreover, a dispersing machine may be employed for dispersing and mixing the pigment or the pigment dispersion in a nonaqueous vehicle, an aqueous vehicle or a solvent. Examples of the dispersing machine include, but are not limited to, a dissolver, a high-speed mixer, a homomixer, a kneader, a roll mill, a sandmill and an attriter. The employment of such a dispersing machine enables a satisfactory dispersion of the pigment.

In a pigment dispersion comprising a nonaqueous vehicle, a satisfactory flowability, such as low viscosity or low structural viscosity, is exhibited in case of a pigment dispersion comprising a dispersant of general formula (1) comparing to a pigment dispersion comprising no dispersant of general formula (1). Furthermore, the printing ink and paint coating of the present invention do not show problems such as color separation and a change in crystals, and is able to afford printed matters or coating films having a good gloss, and hence beautiful products can be obtained.

The pigment dispersant and pigment composition of the present invention are excellent in a dispersing effect in printing inks, paint coatings and colored plastics which comprise aqueous vehicle, and afford printed matters, coating films and colored matters which have a tinting power. Furthermore, they are effective for the applications for which high pigment dispersion is required, such as magnetic paint coating, color filters and ink jet printing.

The vehicles usable in the pigment dispersion of the present invention include nonaqueous vehicles and aqueous vehicles. Examples of the nonaqueous vehicles include, but are not limited to, lime rosin varnishes, polyamide resin varnishes, urethane resin varnishes and vinyl chloride resin varnishes. They are used in gravure inks, nitrocellulose lacquers, cold-setting or baking paint coatings of aminoalkyd resins, acrylic lacquer, baking paint coatings of aminoacrylic resins, urethane-based resin paint coatings, and the like. Examples of aqueous vehicle include, but are not limited to, an aqueous acrylic resin varnish and aqueous urethane resin varnish. A "vehicle" comprises a resin and a solvent which dissolves or disperses the resin, which is a medium dispersing a pigment composition. The ratio of a solvent to a resin in a vehicle is 100 to 10,000, more preferably to 400 to 2,000 parts by weight of a solvent to 100 parts by weight of a resin preferably. Further, 100 parts by weight of a pigment dispersant is mixed with preferably 500 to 100,000, more preferably 1,000 to 50,000 parts by weight of a vehicle.

The pigment dispersion of the present invention contains a resin. Any resins can be used, so long as they can be used in usual paint coatings and inks. Examples of such resins include, but are not limited to, a nitrocellulose, cellulose acetate, ethylcellulose, urethane resin, polyamide resin, polyvinylbutyral resin, acrylic resin, polyester resin, alkyd resin, lime rosin, tall oil resin, wood rosin, rosin eater, rosin-modified phenol, petroleum resin, linseed oil, tung oil, soybean oil, maleic acid resin, vinyl resin, cyclized rubber, chlorinated rubber, ethylene-vinyl acetate resin, gilsonite, dammar, shellac, epoxy resin, vinyl chloride, silicon resin, melamine resin, urea resin, benzoguanamine resin, and the like. Among them, a urethane resin having a molecular weight of 5,000 to 100,000 has been used as a binder for inks and the like conventionally, an effect was hardly observed with conventional pigment dispersants and it has been difficult to disperse pigments. However, according to the pigment composition of the present invention, a large effect can be obtained specifically.

As the resin to be used in the pigment dispersion of the present invention, one or more kinds of the above resins may be dispersed to obtain a pigment dispersion, and a high concentration pigment dispersion containing one or more resins may be diluted with the other resins to obtain another pigment dispersion.

In general, the polyurethane resin to be used as a binder for printing inks and the like contains a component obtained by the reaction of a polyhydroxy compound with a polyisocyanate as a main structure. Moreover, the urethane resin is generally converted into a higher molecular weight resin by the reaction called a chain-extension reaction using one or more kinds of compounds such as glycols, diamines, and aminoalcohols for the purpose of imparting a capability as the binder. In the present invention, the chain-extension reaction of a urethane resin with a diamine or an amino alcohol may be carried out to obtain a relatively strongly basic urethane resin having at least one urea bond in one molecule. When such a urethane resin is used, a remarkable effect is obtained in the pigment dispersion.

The pigment dispersion of the present invention contains an organic solvent. Examples of the organic solvent include, but are not limited to, aromatic hydrocarbons such as toluene; petroleum hydrocarbons such as mineral spirit: halogenated hydrocarbons such as chlorobenzene; ketones such as acetone, methyl ethyl ketone, methyl isobutyl ketone and cyclohexanone; esters such as ethyl acetate, butyl acetate, amyl acetate and 2-ethoxyethyl acetate: alcohols such as methanol, ethanol, propanol and butanol; and cellosolves such as ethyl cellosolve and butyl cellosolve. Particularly preferable are highly polar organic solvents such as ketones, alcohols, cellosolves, and esters. Needless to say, the organic solvent may be a mixture of two or more of them.

The pigment composition or the pigment dispersion of the present invention can be used in printing inks or paint coatings. Examples of additives used for a vehicle contained in a printing ink and a paint coating include, but are not limited to, antifoaming agents, leveling agents, antiblocking agents, surfactants, viscosity regulators, and waxes.

EXAMPLES

The following will describe the present invention with reference to Examples. In the Example, "part(s)" represents "part(s) by weight" and "%" represents "% by weight".

Production Example 1

15 parts of Pigment Red 166 was added to 300 parts of 99% sulfuric acid, and a reaction was conducted for 3 hours at 25° C. The reaction solution was poured into 3,000 parts of ice water, and stirred and filtered. The reminder was washed with 2% hydrochloric acid aqueous solution to give a press cake. The press cake was transformed into slurry with 700 parts of water, and then the slurry was adjusted to pH 9 with sodium hydroxide. Then, it was heated to 60° C., and 58 parts of a 10% aluminum sulfate aqueous solution was charged. The mixture was stirred for 1 hour at 60° C. and filtered, and the remainder was washed with water and dried to obtain 18 parts of Pigment Dispersant (a). The average number of the sulfonic acid substituents was found to be 1.8 in one molecule.

Production Example 2

A pigment dispersant was produced in the same manner as in Production Example 1 except that Pigment Red 166 was changed to Pigment Red 214, reaction temperature of 25° C. was changed to 30° C., and 58 parts of the 10% aluminum sulfate aqueous solution was changed to 29 parts of a 10% calcium chloride aqueous solution, whereby 17 parts of Pigment Dispersant (b) was obtained. The average number of the sulfonic acid substituents was found to be 1.5 in one molecule.

Production Example 3

A pigment dispersant was produced in the same manner as in Production Example 1 except that Pigment Red 166 was changed to Pigment Red 144, reaction temperature of 25° C. was changed to 20° C., and SB parts of the 10% aluminum sulfate aqueous solution was changed to 33 parts of a 10% ferrous sulfate aqueous solution, whereby 18 parts of Pigment Dispersant (c) was obtained. The average number of the sulfonic acid substituents was found to be 1.2 in one molecule.

Production Example 4

A pigment dispersant was produced in the same manner as in Production Example 1 except that Pigment Red 166 was changed to Pigment Red 221, reaction temperature of 25° C. was changed to 20° C., and 58 parts of the 10% aluminum sulfate aqueous solution was changed to 25 parts of a 10% strontium chloride aqueous solution, whereby 17 parts of Pigment Dispersant (d) was obtained. The average number of the sulfonic acid substituents was found to be 1.0 in one molecule.

Production Example 5

A pigment dispersant was produced in the same manner as in Production Example 1 except that 58 parts of the 10% aluminum sulfate aqueous solution was changed to 128 parts thereof, whereby 20 parts of Pigment Dispersant (e) was obtained. The average number of the sulfonic acid substituents was found to be 4.0 in one molecule.

Examples 1 to 16, Comparative Examples 1 to 4

As shown in Table 1, 10 parts of a pigment composition wherein any one of Pigment Dispersants (a) to (d) was added to each pigment, 90 parts of a varnish for gravure ink, and 100 parts of 3 mm glass beads were mixed. The varnish for gravure ink contained 12% of nitrocellulose, 33% of ethyl acetate, 30% of toluene, 15% of isopropyl alcohol, and 10% of methanol. The resulting mixture was dispersed for 60 minutes by means of a paint conditioner, which was a wet fine particle-dispersing and pulverizing machine. Moreover, as Comparative Example, various pigments alone were similarly dispersed without adding any pigment dispersant to form a gravure ink containing no pigment dispersant. The viscosity of the formed ink was measured by means of a B-type viscometer (6 rpm). Furthermore, the formed ink was spread over a film by a bar coater to give a coated film, and a gloss (60°) of the dried film was measured. These results are shown in Table 1.

In Examples 1 to 16, the inks containing the pigment dispersants of the present invention showed excellent flowability, that is, low viscosity, and excellent gloss of the coating films. On the other hand, the inks containing no pigment dispersant of the invention showed high viscosity in Comparative Examples 2 and 4, and inferior gloss of the coating film in Comparative Examples 1 to 4.

TABLE 1

| Example No. | Pigment | Dispersant | Amount of Added Dispersant (to pigment) | Viscosity 6 rpm (mP · s) | Gloss 60° (%) |
|---|---|---|---|---|---|
| Comp. Ex. 1 | C. I. | — | — | 1620 | 34 |
| Example 1 | Pigment | a | 5% | 380 | 55 |
| Example 2 | Red 185 | b | 5% | 420 | 53 |
| Example 3 |  | c | 5% | 450 | 52 |
| Example 4 |  | d | 5% | 450 | 52 |
| Comp. Ex. 2 | C. I. | — | — | 4500 | 30 |
| Example 5 | Pigment | a | 5% | 1350 | 52 |
| Example 6 | Red 146 | b | 5% | 1480 | 51 |
| Example 7 |  | c | 5% | 1500 | 50 |
| Example 8 |  | d | 5% | 1650 | 50 |
| Comp. Ex. 3 | C. I. | — | — | 1400 | 28 |
| Example 9 | Pigment | a | 3% | 380 | 50 |
| Example 10 | Red 166 | b | 3% | 420 | 50 |
| Example 11 |  | c | 3% | 480 | 48 |
| Example 12 |  | d | 3% | 500 | 48 |
| Comp. Ex. 4 | C. I. | — | — | 3500 | 20 |
| Example 13 | Pigment | a | 7% | 800 | 48 |
| Example 14 | Red 221 | b | 7% | 950 | 45 |
| Example 15 |  | c | 7% | 1100 | 43 |
| Example 16 |  | d | 7% | 1270 | 43 |

Viscosity: measured at 25° C. by use of a B-type rotary viscometer.
Gloss: 60° deflected gloss value

Examples 17 to 32, Comparative Examples 5 to 10

As shown in Table 2, 20 parts of a pigment composition that any one of Pigment Dispersants (a) to (a) was added to each pigment, 80 parts of a varnish for gravure Ink, 2 parts of a polymeric pigment dispersant ("Ajisper PB821" manufactured by Ajinomoto Fine-Techno Co. Inc.), and 100 parts of 3 mm glass beads were mixed. The varnish for gravure ink contained 15% of a urethane resin, 65% of ethyl acetate, and 20% of isopropyl alcohol. Then, the resulting mixture was dispersed for 60 minutes by means of a paint conditioner to form a pigment dispersion (Examples 17 to 32 and Comparative Examples 8 and 10). Furthermore, as Comparative Examples 5 to 7 and 9, various pigments were similarly dispersed to form a pigment dispersion containing no pigment dispersant of the invention. The above urethane resin had a urea bond and a weight average molecular weight of about 30,000, and was obtained by performing chain elongation of its prepolymer with an isophoronediamine, the prepolymer was obtained by performing polycondensation of an isophorone diisocyanate with a polyester polyol formed from a polycondensation of 3-methyl-1,5-pentanediol with adipic acid.

The viscosity of the formed pigment dispersion was measured by a B-type viscometer (6 rpm). Then, a solvent composed of 70% of ethyl acetate and 30% isopropyl alcohol was added to the formed pigment dispersion, a time of flow was adjusted to 14 to 16 seconds with Zahn cup No. 4 to obtain a gravure ink. The obtained ink was spread over a film by a bar coater to obtain a coated film, and then a gloss (60°) of the dried coated film was measured. Furthermore, the formed ink was spread over a Nylon film, and the coated surface of the Nylon film was closely adhered onto an uncoated Nylon film to prepare a test pieace. After this test piece was boiled at 100° C. for 1 hour, a migrating property of color to the uncoated film was investigated (bleeding test). These results are shown in Table 2.

In Examples 17 to 32, the pigment dispersion containing a pigment dispersant of the present invention showed excellent flowability, that is, low viscosity and excellent gloss of the coating films. On the other hand, a pigment dispersion containing no pigment dispersant of the invention showed high viscosity in Comparative Examples 5 to 7, 9 and 10, and inferior gloss of the coating films in Comparative Examples 5 to 7 and 9.

Moreover, in Comparative Examples 8 and 10, the inks containing Pigment Dispersant (e) having 4 or more sulfonic acid groups in one molecule resulted in migration of color from the coated film to the uncoated film. On the other hand, in Examples 17 to 32, the inks containing the pigment dispersants of the present invention resulted in no migration.

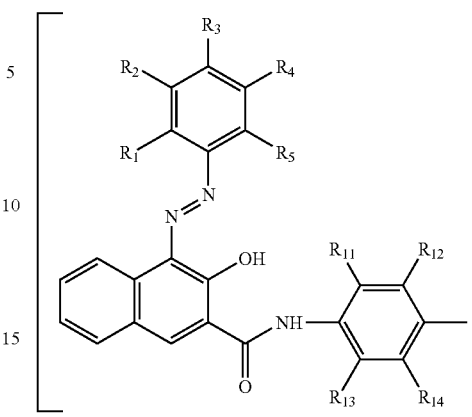

TABLE 2

| Example No. | Pigment | Dispersant | Amount of Added Dispersant (to pigment) | Viscosity 6 rpm (mP · s) | Gloss 60° (%) | Bleeding test |
|---|---|---|---|---|---|---|
| Comp. Ex. 5 | C. I. Pigment Red 185 | — | — | 58000 | 30 | Good |
| Example 17 | | a | 5% | 2580 | 52 | Good |
| Example 18 | | b | 5% | 3200 | 50 | Good |
| Example 19 | | c | 5% | 3450 | 50 | Good |
| Example 20 | | d | 5% | 4100 | 48 | Good |
| Comp. Ex. 6 | C. I. Pigment Red 146 | — | — | 53000 | 32 | Good |
| Example 21 | | a | 5% | 1650 | 54 | Good |
| Example 22 | | b | 5% | 1880 | 52 | Good |
| Example 23 | | c | 5% | 2100 | 51 | Good |
| Example 24 | | d | 5% | 2500 | 50 | Good |
| Comp. Ex. 7 | C. I. Pigment Red 166 | — | — | 5500 | 35 | Good |
| Example 25 | | a | 3% | 380 | 75 | Good |
| Example 26 | | b | 3% | 440 | 73 | Good |
| Example 27 | | c | 3% | 500 | 72 | Good |
| Example 28 | | d | 3% | 580 | 70 | Good |
| Comp. Ex. 8 | | e | 3% | 950 | 65 | No good |
| Comp. Ex. 9 | C. I. Pigment Red 221 | — | — | 95000 | 25 | Good |
| Example 29 | | a | 7% | 2400 | 72 | Good |
| Example 30 | | b | 7% | 3000 | 70 | Good |
| Example 31 | | c | 7% | 3500 | 70 | Good |
| Example 32 | | d | 7% | 4400 | 69 | Good |
| Comp. Ex. 10 | | e | 7% | 32500 | 55 | No good |

Viscosity: measured at 25° C. by use of a B-type rotary viscometer.
Gloss: 60° deflected gloss value
Bleeding Test: "No good" means colored; "Good" means non-colored.

Furthermore, the pigment compositions containing the above Pigment Dispersants (a) to (d) did not cause aggregation even when they were used in paint coatings containing resins such as aminoalkyd or aminoacrylic resins and showed satisfactory flowability and gloss of coating films.

It is further understood by those skilled in the art that the foregoing description is a preferred embodiments of the invention and that various changes and modifications may be made in the invention without departing from the sprit and scope thereof.

What is claimed is:

1. A pigment dispersant represented by the following general formula (1):

-continued

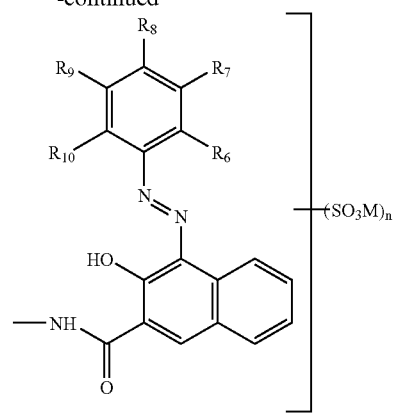

wherein $R_1$, $R_2$, $R_3$, $R_4$, $R_5$, $R_6$, $R_7$, $R_8$, $R_9$ and $R_{10}$ each independently is —H, —Cl, —$CH_3$, —$CF_3$, —$NO_2$, —$COOCH(CH_3)_2$ or —$COOCH_2CH_2Cl$; $R_{11}$, $R_{12}$, $R_{13}$ and $R_{14}$ each independently is —H, —Cl, —$CH_3$ or —CN; M is one equivalent of a bivalent or trivalent metal; and n is an integer of 1 to 3.

2. A pigment composition comprising at least one pigment selected from the group consisting of naphthol pigments and condensed azo pigments, and a pigment dispersant according to claim 1.

3. The pigment composition according to claim 2, which further comprises a polymeric pigment dispersant having a weight average molecular weight of 1,000 to 100,000.

4. A pigment dispersion wherein the pigment composition according to claim 2 is dispersed into a nonaqueous or an aqueous vehicle.

5. The pigment dispersion according to claim 4, wherein the nonaqueous vehicle comprises a resin having a weight average molecular weight of 5,000 to 100,000, and the resin is a urethane resin having at least one urea bond in one molecule.

6. A printing ink which comprises the pigment dispersion according to claim 4 or 5.

* * * * *